March 27, 1934.  F. J. OAKES  1,952,885
INTERLOCKING SILENT CHAIN
Filed July 19, 1930
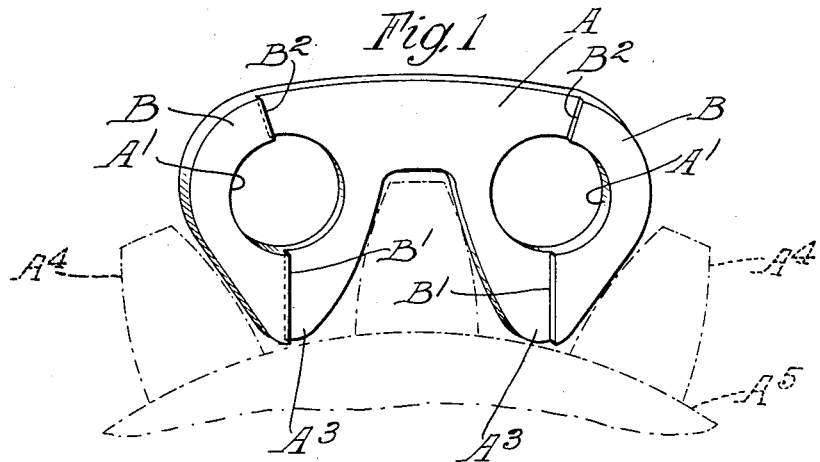
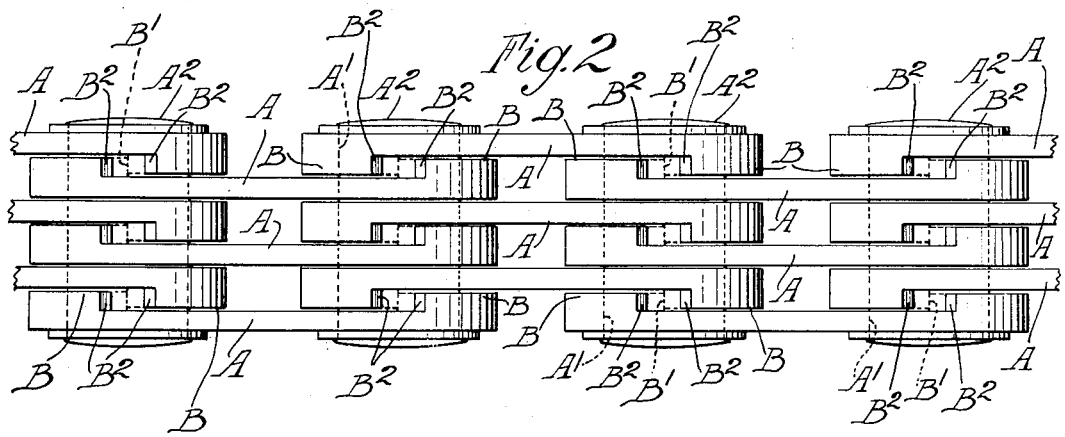
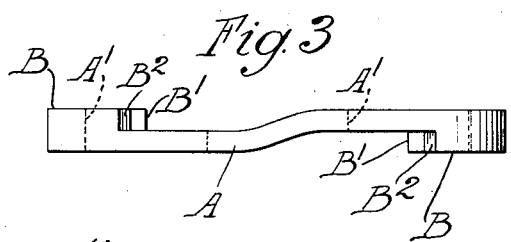
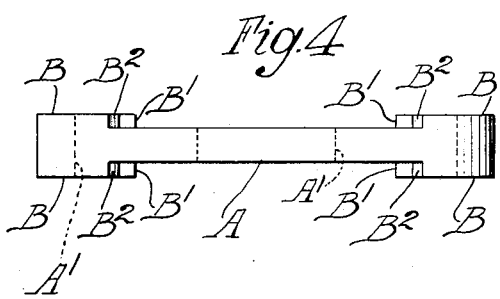
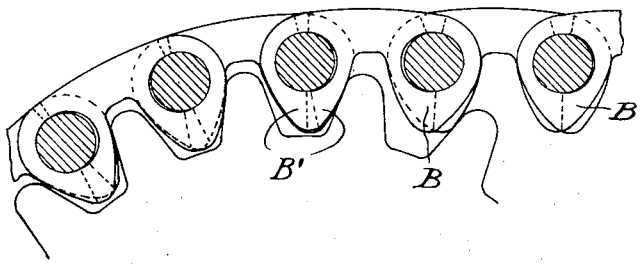
Inventor
Frank J. Oakes
by Parker & Carter
Attorneys.

Patented Mar. 27, 1934

1,952,885

UNITED STATES PATENT OFFICE 1,952,885

INTERLOCKING SILENT CHAIN

Frank J. Oakes, Indianapolis, Ind., assignor to Link-Belt Company, Chicago, Ill., a corporation of Illinois Application July 19, 1930, Serial No. 469,032

1 Claim. (Cl. 74—31)

My invention relates to improvements in interlocking silent chain and has among its objects to provide in connection with a silent chain means to prevent harmonic vibration of the free strand of chain between sprockets by positively preventing movement through one half of the natural amplitude of such vibration.

Another object is to provide a frictional joint chain in which the total load is transmitted from one pitch of links to an adjacent pitch of links by means of contact between surfaces which are in their entirety at ninety degrees to the line of pull on the chain. This applies to chain between sprockets. Around the sprockets, portions of the total chain load are carried by the pins.

Another object is to provide a chain in which the pitch, when under tension only with no bending, is determined by interlocking faces of links and is independent of pin diameter, so that the original angular positional relation of driven shaft to driving shaft will be maintained as the chain wears.

Another object is to permit adequate lubrication of the pintle across any width of chain. Between interlocking faces of links there are openings giving access to the pintle surface. As the chain articulates these spaces are alternately open and closed so there will be a pumping action forcing oil to the pin regardless of the direction of gravitational or centrifugal force. When the opening below the pin is closed, that above the pin is open, and vice versa.

Another object is to provide a chain of the silent type with interlocking links so that the pin is entirely relieved of the chain load at the time when the load is normally at its maximum, when the pin is between driver and driven sprocket on the pull side, resulting in greatly increased life for this type of joint.

Another object is to separate the function of supplying a bearing for articulation from the function of transmitting load.

My invention is illustrated more or less diagrammatically in the accompanying drawing, wherein—

Figure 1 is a perspective view of a chain link;

Figure 2 is a plan view of a chain made up of links such as that of Figure 1 assembled showing the chain in the position it assumes between the sprockets;

Figure 3 is a plan view of a modified form of link;

Figure 4 is a further modified form of link;

Figure 5 is a side elevation showing the chain wrapped around a sprocket.

Like parts are indicated by like characters throughout the specification and drawing.

The chain shown in Figure 2 is made up of a series of chain links A A. Each link has adjacent either end holes $A^1$ through which pass the pivot pins $A^2$ to join the links together in articulated relation to form an endless silent chain belt. The details of the pivot pins and their relation form no part of the present invention and are shown diagrammatically only.

Each chain link has on one side adjacent each end, the chain teeth $A^3 A^3$, and these chain teeth are adapted to cooperate with the sprocket teeth $A^4$ of a sprocket $A^5$ either in driving or driven relation and it may be the exterior surfaces of the chain teeth or the interior surfaces or both or one of each which contacts the opposed working surfaces of the sprocket teeth to provide the driving relation between chain and sprocket.

When the chain is wound or articulated about the sprocket, tension along the chain is resisted by the pivot pin and by the relation between the chain teeth and the sprocket teeth in the usual form of silent chain. Between the sprockets there is nothing to assist the pivot pin and it carries in shear the entire load formed by the tension in the chain. In the conventional type of chain there is nothing to prevent articulation of adjacent chain links in either direction from the line of movement of the chain and so we have always present in the conventional type of silent chain harmonic vibration of the chain across its line of travel or across the line joining the pitch circles of the chain on adjacent sprockets.

In my chain, there is located at either end of the link the boss B. Each boss has a working surface $B^1$ on the tooth side of the pivot pin and a working surface $B^2$ on the side of the pivot pin opposed to the link tooth. As shown in Figure 2, the links are assembled with these bosses interlocking so that when the chain is wound around the sprocket angular movement of the links frees these surfaces from contact with each other. When the chain assumes a straight line between the sprockets, the working surfaces $B^1$ come together and relieve the pivot pins of the tension load otherwise placed upon them. The relation between the chain links and these surfaces is such that angular movement of adjacent chain teeth is limited. The chain links can articulate or pivot about the pintles to cause the link teeth to mesh with the sprocket teeth, but upon emerging from the sprocket the artculation of the links about their pintles in the reverse direction is limited by the relation of interlocking tooth surfaces on adjacent chain links to the extent that the links will be in line with one another, and the load is taken off the pivot pin and carried by the opposed faces of the interlocking link and it is the engagement of these faces which prevents further articulation of the joints after they have passed beyond the position of sprocket engagement, thereby limiting vibration.

In previous designs the heaviest burden on the pivot pin comes when the chain is carrying the full tension and is not supported or assisted by the sprocket. The vibratory movement across the line of movement with the chain under load at a time when lubrication is most difficult exerts very serious wear on the chain. My structure prevents this because at the time of heaviest load when the chain is away from the sprocket, the tension is carried not by the pin but by the interlocking link surfaces and thus instead of having one pivot pin to hold the pieces together for articulation and carry the load in tension, I divide this work between the pivot pin which operates when the chain is being wound onto or off the sprocket and the interlocking shoulders which come into operation only when the chain is under tension between the sprockets.

I claim:

A chain comprising a plurality of chain links apertured at their ends, pivot pins upon which successive staggered links are articulated to form a continuous chain belt, teeth projecting laterally from one edge of each link generally in line with the apertures, lugs projecting each from the same side of the link, one adjacent each aperture, the lugs having working surfaces perpendicular to the plane of the link and intersecting the aperture and generally perpendicular to a line joining the centers of the two apertures, heads on the pivot pins preventing lateral displacement of the links and to maintain the links in such position that opposed working surfaces on the lugs of each link of a pair are in alignment, said opposed working surfaces being adapted to engage one another and assist the pivot pin in resisting the tension load on the chain when the chain is straight.

FRANK J. OAKES.